United States Patent [19]

Haraden

[11] Patent Number: 4,868,722

[45] Date of Patent: Sep. 19, 1989

[54] HEADLAMP ASSEMBLY

[75] Inventor: Thomas Haraden, Ipswich, Mass.

[73] Assignee: GTE Products Corporation, Danvers, Mass.

[21] Appl. No.: 286,026

[22] Filed: Dec. 19, 1988

[51] Int. Cl.[4] .......... B60Q 1/04

[52] U.S. Cl. .......... 362/80; 362/61; 362/226; 362/310

[58] Field of Search .......... 362/61, 80, 226, 267, 362/310, 448

[56] References Cited

U.S. PATENT DOCUMENTS

| | | | |
|---|---|---|---|
| 3,917,939 | 11/1975 | Schmidt et al. | 362/267 |
| 4,339,790 | 7/1982 | Hanson et al. | 362/310 X |
| 4,660,128 | 4/1987 | Bergin et al. | 362/310 X |
| 4,772,989 | 9/1988 | Haraden | 362/226 X |

*Primary Examiner*—Stephen F. Husar

*Attorney, Agent, or Firm*—Edward J. Coleman; William E. Meyer; Owen J. Meegan

[57] ABSTRACT

A motor vehicle headlight module includes a lens and reflector assembly and a capsule-connector assembly. The reflector comprises an elongated neck portion forming a substantially rectangular chamber opening into the lens and reflector assembly and extending rearwardly therefrom, the rear of the chamber terminating in a groove of defined width extending around the periphery of the chamber. The capsule-connector assembly is provided with a forwardly projecting lighting capsule and a flange having a forwardly facing tongue of less thickness than the groove width and aligned for mating engagement in the groove. A plurality of spaced ribs are disposed on the outer surface of the rectangular chamber to contact the capsule-connector flange at their rearward ends. At least two of the rib ends are tacked to the capsule-connector flange to maintain the lighting capsule in proper location during the setting of an adhesive material disposed in the reflector groove.

15 Claims, 4 Drawing Sheets

HEADLAMP ASSEMBLY

BACKGROUND OF THE INVENTION

The present invention relates to a new and improved headlight module for use in a lighting system for motor vehicles and more particularly, to a headlight module for use in a lighting system designed specifically to provided for improved aerodynamic performance of the motor vehicle as well as ease of replacement of the modules employed in the headlighting system.

The prior art discloses a plurality of arrangements of headlight modules for use in a lighting system to which the present invention generally relates, for example, U.S. Pat. No. 4,545,001 issued to G. J. English et al, U.S. Pat. No. 4,569,002 issued to G. J. English et al, U.S. Pat. No. 4,646,207 issued to R. E. Levin et al, U.S. Ser. No. 598,615 filed in the name of G. J. English et al and U.S. Pat. Nos. Des. 285,351 issued to G. J. English et al, 284,112 issued to G. J. English et al and 283,362 issued to R. E. Levin et al., All of the above cited applications and patents having been filed Apr. 10, 1984 and assigned to the assignee of the present invention.

Also, among the prior art patents referenced herein are U.S. Pat. No. 4,707,767 issued in the name of J. A. Bergin et al and U.S. Pat. No. 4,660,128 issued to J. A. Bergin et al, both filed on Mar. 17, 1986 and assigned to the assignee of the present application.

A device which more particularly relates to the present invention, however, is shown in U.S. Pat. No. 4,772,989 entitled "Motor Vehicle Headlight Module" issued Sept. 20, 1988 to Thomas Haraden and assigned to the assignee of the present invention.

In that patent, which is herein incorporated by reference, there is shown a headlight module which is intended to alleviate the potential problem regarding close tolerance control between the lighting capsule and the reflecting portion of the reflector during assembly of the headlight module. Briefly, the patent discloses a connector molded integral with the reflector and a capsule which is separately welded to an assembly which included an electrically insulative body portion with an attached metal contact. The capsule assembly with the capsule attached is inserted into a cavity at the rear of the reflector, power is supplied, and the capsule is moved in a plane perpendicular to an imaginary line extending from the aperture toward the forward lens to obtain proper focus. With this accomplished, the metal contact attached to the capsule is welded to metal pieces in the reflector to fix the capsule position and the cavity is filled with epoxy for sealing.

While the above briefly described configuration has proved satisfactory in achieving the objectives of the improving a module of the type under consideration, it has been found that a headlight module of the type described is subject to improvement by minimizing the number of parts employed in the module construction, eliminating the welding inside the rear reflector cavity and the elimination of insert molding of metal pieces in the reflector, all of which are effective to reduce the cost of constructing the headlight module assembly.

It is therefore an object of the present invention to provide a new and improved motor vehicle headlight module which obviates the disadvantages in the manufacturing and assembly of existing headlight module assemblies.

A further object of the invention is to provide a new and improved motor vehicle headlight module which minimizes the number of parts employed in assembly of the module.

A further object of the invention is to provide a new and improved motor vehicle headlight module wherein the need for insert molding metal pieces in the reflector, or the welding of components inside the rear reflector cavity are eliminated.

Yet another object of the invention is to provide a headlight module of the type described which requires less time to manufacture and is therefore less costly than existing headlight modules of the type disclosed.

SUMMARY OF THE INVENTION

The aforementioned objects, and other objectives which will become apparent as the description proceeds are accomplished by providing a motor vehicle headlight module which comprises a reflector and lens assembly including a lens disposed at the front of a reflector having a rearwardly protruding elongated neck portion forming a chamber opening into the assembly. A separate capsule-connector assembly comprises a lighting capsule extending axially through the chamber and into the reflector lens assembly, the lighting capsule having its leads connected to a connector member disposed at the rear of the chamber. Means are provided for connecting the connector member and the chamber, one with the other comprising a groove disposed on one and a tongue disposed on the other and a curable adhesive material is provided in the groove for fixing the connector member to the chamber. The tongue and groove extend substantially around the periphery of the rear of the chamber and are aligned substantially along the optical axis of the reflector, the groove being wider than the tongue such that the capsule-connector assembly is movable at right angles to the axis of the lighting capsule prior to the curing of the adhesive material into the groove.

The method of manufacturing a motor vehicle headlight module includes the steps of providing a lens and reflector assembly wherein the reflector has a lens disposed at the front thereof and a rearwardly protruding elongated neck forming a chamber opening into the assembly, and a capsule-connector assembly comprising a lighting capsule extending forwardly and having its leads connected to a connector member and means for connecting the connector member and the chamber one with the other comprises a tongue disposed on one extending substantially around the periphery of the rear of the chamber and a groove on the other extending substantially around the periphery of the rear of the chamber when assembled, the groove being of greater width than the tongue. A curable adhesive material is deposited in the groove and the connector member is assembled to the chamber with the lighting capsule extending through the chamber by inserting the tongue into the curable adhesive in the groove. The connector member is moved relative to the chamber in a direction at right angles to the optical axis of the reflector to place the lighting capsule at a desired location relative to the reflector, and the adhesive is cured to fix the connector member to the chamber.

BRIEF DESCRIPTION OF THE DRAWING

The foregoing and other features of the invention will be more particularly described in connection with the preferred embodiment and with reference to the accompanying drawing, wherein.

DESCRIPTION OF THE PREFERRED EMBODIMENT

Figure 1:
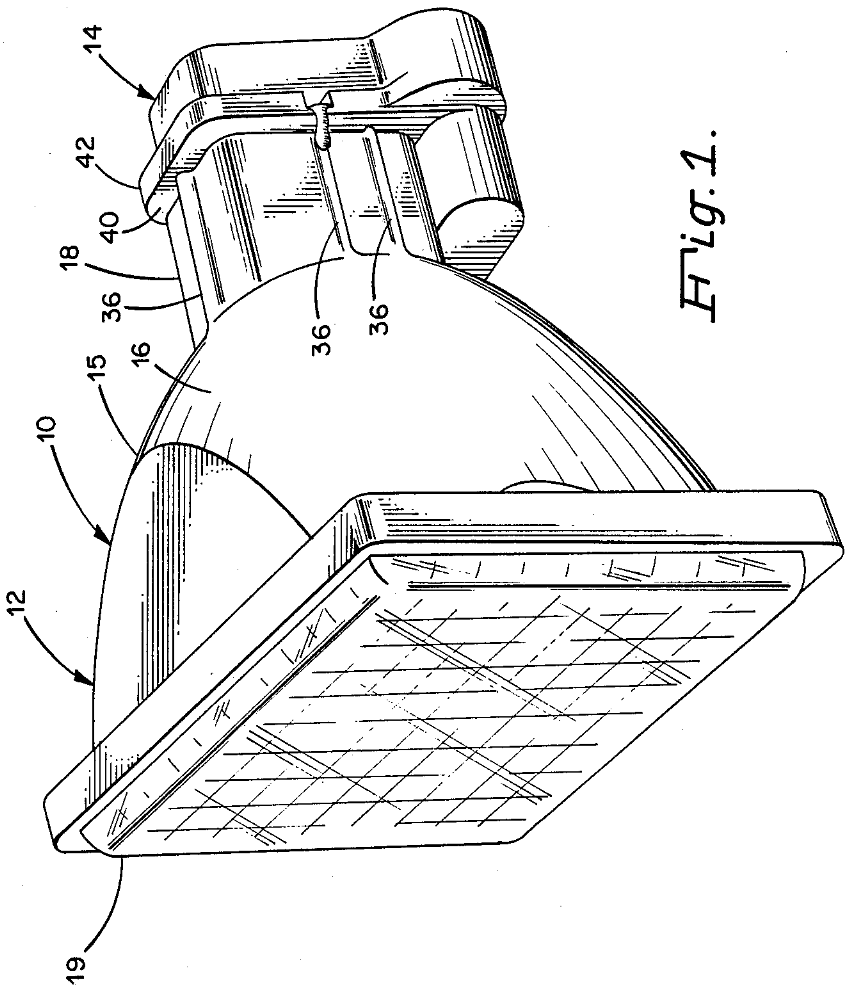
FIG. 1 is an elevational perspective view showing a motor vehicle headlight module constructed in accordance with the teachings of the present invention.
Figure 2:
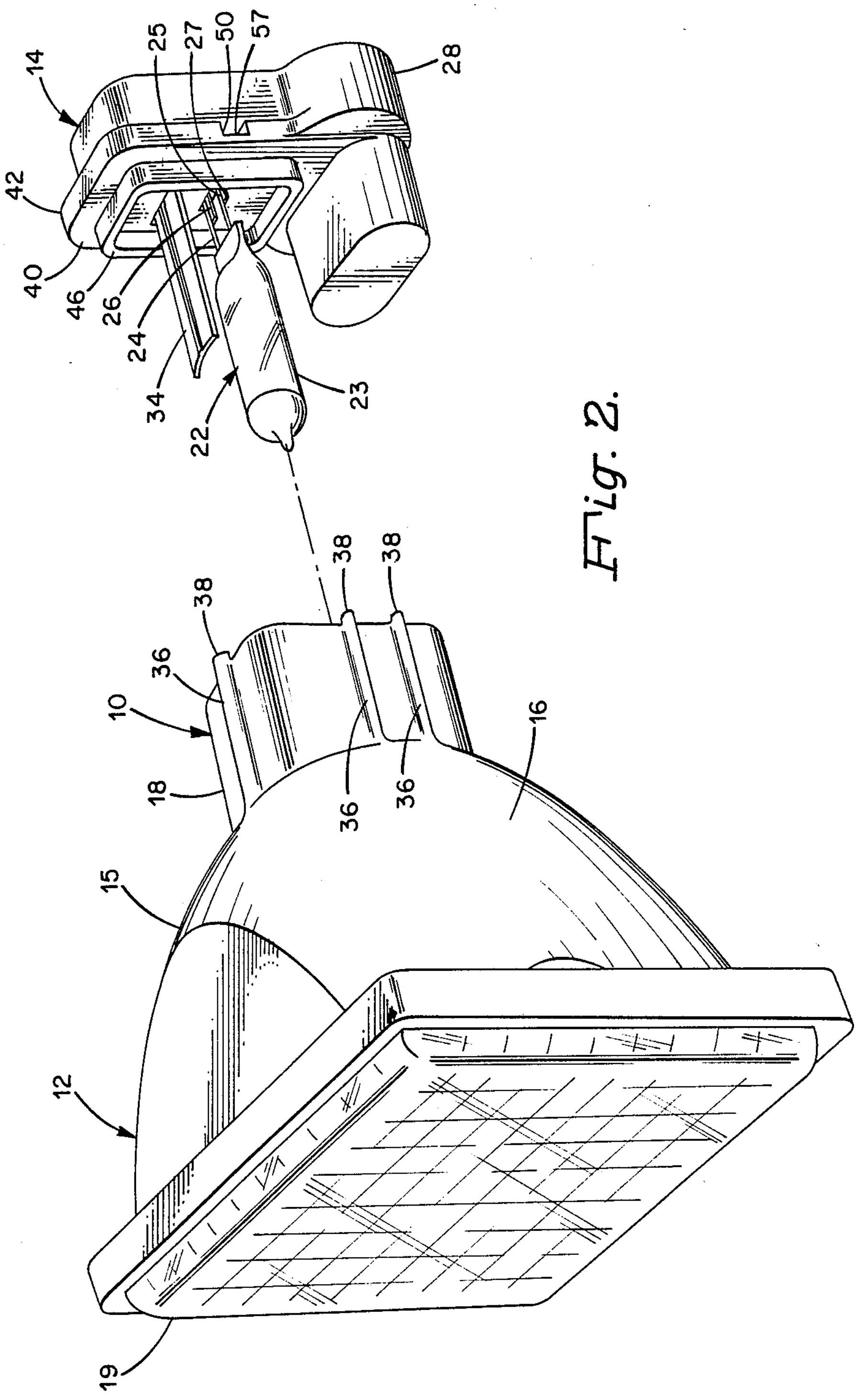
FIG. 2 is a perspective exploded view showing details of the capsule-connector assembly and the lens and reflector assembly which comprise the module of FIG. 1.

Referring now to the drawing and in particular to FIGS. 1 and 2, there is shown a motor vehicle headlight module 10 comprising a lens and reflector assembly 12 and a separate capsule-connector assembly 14, as best shown in FIG. 2. The lens and reflector assembly 12 includes an electrically insulative reflector 15 which may be manufactured from a suitable plastic material and which includes a reflecting portion 16 (See FIG. 3) having a rearwardly protruding neck potion 18 extending from adjacent the reflecting portion. A lens 19 is secured across the rectangular opening in the front of the reflector 15 to provide a closure for the lens reflector assembly.

Figure 3:
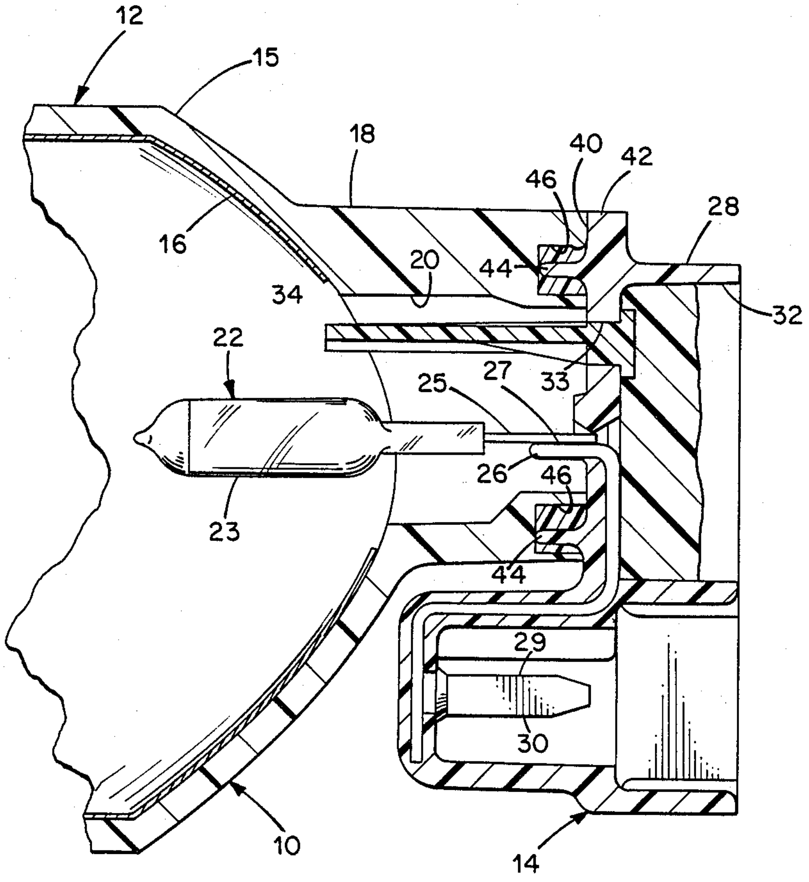
FIG. 3 is a fragmentary elevational sectional view showing a portion of the structure of FIG. 1 taken on an enlarged scale for clarity.

Referring still to FIGS. 1 and 2, taken in conjunction with FIG. 3, the neck portion 18 forms an opening from the interior of the reflector and provides a substantially rectangular chamber 20 through which a lighting capsule 22 extends into the interior of the reflector portion 16. The lighting capsule 22 comprises a glass envelope 23 and a pair of conductive lead-in wires 24 and 25 which are attached to a pair of conductive terminals 26 and 27 by welding or other suitable means. The conductive terminals 26 and 27 are molded into a connector member 28 and terminate in a pair of pins 29 and 30 extending rearwardly into an opening in the connector member into which a mating plug is inserted to energize the lighting capsule 22. The connector member 28 is manufactured of a plastic insulative material and in addition to the rear opening in which the pins 29 and 30 are located comprises a second rearwardly facing cavity 32 having a slot 33 provided therein into which is mounted a heat shield member 34 extending into the chamber 20 of the neck portion 18. The heat shield 34 will not be described in greater detail herein as it is described in detail as the subject of co-pending U.S. patent application, Ser. No. 160,363 filed on Feb. 25, 1988 and assigned to the assignee of the present invention.

In FIGS. 1 and 2 it will be noted that on the external surface of the neck portion 18, there is disposed a plurality of elongated rib members 36 terminating a slight distance beyond the rear surface of the chamber 20 and providing end surfaces 38 for contacting the frontal surface 40 of the connector member 28. In the embodiment shown, there are five such rib members 38, one disposed substantially at the top center of the neck 18 and two disposed on either side of the neck, two of which are shown in FIGS. 1 and 2, the remaining two being disposed on the opposite side of the neck and spaced substantially as those which are evident from FIGS. 1 and 2.

Referring to FIGS. 2 and 3, the frontal surface 40 is seen to be formed on a outwardly extending flange 42 and has disposed thereon a forwardly projecting tongue 44 which extends substantially around the circumference of the rear surface of the chamber 20. A mating groove 46 extends around the rear surface of the neck portion 18 adjacent the chamber 20 as is best shown in FIG. 3. It will further be noted that the mating groove 46 is of substantially greater width than the tongue 44 to provide for movement of the tongue within the groove in both the lateral and up and down direction when the tongue is inserted in the groove.

In assembling the headlight module 10 as referenced above, the conductive terminals 26 and 27 are molded into the connector member 28 during fabrication of the connecting member. The capsule 22 is first inserted into the connector member 28 with lead wires 24 and 25 contacting the conductive terminals 26 and 27 and is adjusted axially such that the coil within the envelope 23 will be properly located when the capsule is disposed within the reflector portion 16 with the lens and assembly portion 12 assembled to the capsule-connector assembly 14, as shown in FIG. 3, during a later assembly step. The lead wires 24 and 25 are then welded to the conductive terminals 26 and 27 in a manner well known in the art. The lens 19 is now attached to the reflector 15 and the lens and reflector assembly 12 is oriented with the lens disposed downwardly. The mating groove 46 is then filled with an epoxy resin 48.

The epoxy resin employed may be of the type which is cured using infra-red radiation and thus readily adaptable to mass production, or may be of any heat curable type known in the art.

The capsule-connector assembly 14 is now placed on the end of the neck portion 18 with the flange 42 of the connector member 28 resting solely on the end surfaces 38 of the rib members 36. The end surfaces 38 of the rib members 36 define a reference plane for maintaining the coil within the envelope 23 in focus axially while the envelope 23 is focused rotationally at right angles about an imaginary line extending from the chamber 20 toward the lens 19 to form an optical axis of the reflector portion 16. When so positioned, the tongue 44 is disposed in the epoxy filled mating groove 46 and the clearance provided by the difference in width between the tongue 44 and its mating groove 46 allows the connector member 28 to be moved at right angles to the axis of the reflector portion 16 and the capsule 22 in either the up and down or side to side direction, as viewed in FIGS. 1 through 3 of the drawing.

As a next step, the connector member 28 is moved at right angles to the reflector portion 16 and the capsule 22, as described above. When the proper focus has been found, the connector member 28 is tacked to at least two of the rib members 36 to maintain the desired side to side or up and down relationship of the capsule 22 to the reflector portion 16.

As best shown in FIG. 2, at the points chosen for the tacking process, a notch 50 is formed in the flange 42 to provide a thin web 51. The tacking of the chosen rib 38 to the flange 42 is accomplished by applying heat to the thin web 51 and the end surface 38 of the rib 36 causing the two plastic members to adhere one to the other.

In the present embodiment, the upper most rib 36 on either side of the neck portion 18 is tacked to the frontal surface 40 of the flange 42 and the remaining three ribs are not tacked to the flange 42. The three remaining ribs 38 are spaced equidistant about the centerline of the neck portion 18 and thus maintain the proper axial location of the capsule 22 as their end surfaces 38 remain in contact with the frontal surface 40 of the flange 42 during the tacking operation.

The assembly is carried forward by heat curing the epoxy resin 48 with the capsule 22 properly located within the reflector portion 16. The heat shield 34 is then inserted in the slot 33 at a convenient time prior to, or following, the customary pump and flush operation after which the cavity 32 of the connector member 28 is filled with a suitable epoxy for sealing purposes.

Figure 4A:
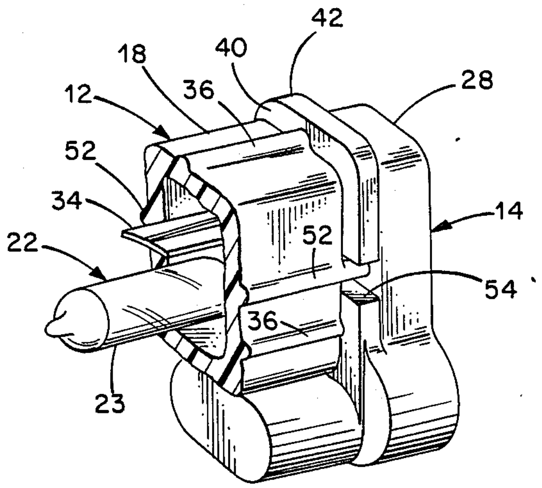
FIG. 4*a* is a fragmentary elevational perspective view showing details of an alternative embodiment of the structure shown in FIG. 1 during assembly.
Figure 4B:
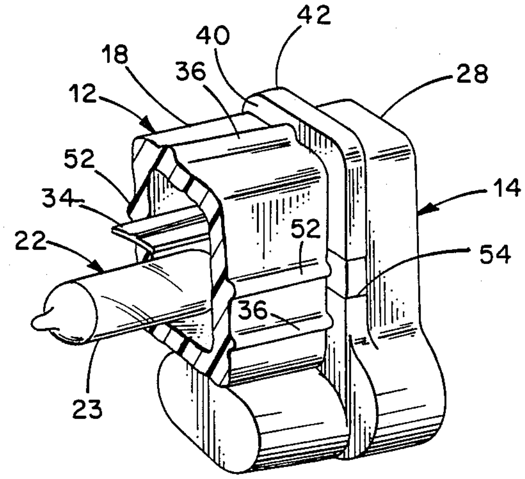
FIG. 4*b* is a fragmentary elevational perspective view similar to FIG. 4*a* showing the structure of 4*a* in the assembled condition.

Referring now to FIGS. 4*a* and 4*b*, showing an alternate embodiment of the headlight module 10 of FIGS. 1 through 3, and wherein like parts have been given like reference numerals, there is shown a lens and reflector assembly 12 and a capsule-connector assembly 14 in which the tongue 44 and mating groove 46 are engaged with the epoxy resin 48 in place as in the process set forth above.

As will noted from FIGS. 4*a* and 4*b*, while the neck portion 18 is provided with five ribs as-in the previously described embodiment, the two ribs 36 of the above described embodiment which are the upper most side ribs and employed for tacking the lens and reflector assembly 12 to the capsule-connector assembly 14 have been replaced by a pair of ribs 52 which extend beyond the rear of the neck portion 18. The flange 42 is provided with a cut-out portion in the form of a rectangular opening 54 having a greater dimension in the up and down direction and in the side to side direction than the height and width of the extending end of a rib 52 to provide for a substantially loose fit of the rearwardly extending end of the rib 52 when disposed in the opening.

As in the prior description of the assembly process, with the end surfaces 38 of the three ribs 36 contacting the frontal surface 40 to maintain the capsule 22 at the proper axial location, the connector member 28 is rotated in the side to side and up and down directions to properly locate the capsule 22 relative to the reflector portion 16. A suitable amount of epoxy or resin having a relatively short reaction time is applied into the rectangular opening 54 and allowed to set to form the tacking operation as was done by heat tacking in the previous embodiment. While the epoxy resin 48 employed in the groove 46 is a heat curable material as previously discussed, the epoxy employed in the opening 54 is generally of a light cured type, well known in the adhesive art, providing instant bonding between a rib 52 and an opening 54. The process is otherwise similar to that previously described in that the proper focus of the capsule 22 relative to the reflector portions 16 in the axial direction is maintained by the end surfaces 38 of the three ribs 36 contacting the frontal surface 40 of the flange 42, and movement in the up and down and side to side direction at right angles to the centerline of the reflector portion 16 in the axial direction is maintained by the epoxy or other adhesive fixing the ends of the ribs 52 in the opening 54.

While it is apparent that changes and modification can be made within the spirit and scope of the present invention, it is my intention, however, only to be limited by the appended claims.

As my invention, I claim.

1. A motor vehicle headlight module comprising:

a reflector and lens assembly including a lens disposed at the front of a reflector having a rearwardly protruding elongated neck portion forming a chamber opening into said assembly;

a separate capsule-connector assembly comprising a lighting capsule extending axially through said chamber and into said reflector lens assembly, said lighting capsule having its leads connected to a connector member disposed at the rear of said chamber; and means connecting said connector member and said chamber one with the other comprising a groove disposed on one and a tongue disposed on the other and a curable adhesive material disposed in said groove for fixing said connector member to said chamber, said tongue and groove extending substantially around the periphery of the rear of said chamber and aligned substantially along the axis of said lighting capsule, said groove being wider than said tongue whereby said capsule-connector assembly is movable at right angles to an imaginary line extending from said chamber toward said lens to form an optical axis of said reflector prior to the curing of said adhesive material into said groove.

2. A motor vehicle headlight module as set forth in claim 1 wherein said connector chamber comprises an outwardly extending flange having a planar forwardly facing surface.

3. A motor vehicle headlight module as set forth in claim 1 wherein said neck portion chamber is substantially rectangular in cross-section.

4. A motor vehicle headlight module as set forth in claim 2 further comprising a plurality of spaced ribs formed on the outer surface of said chamber, each of said ribs having a rearward facing end surface for contacting said forwardly facing surface of said flange.

5. A motor vehicle headlight module as set forth in claim 4 wherein at least two of said ribs are fixed to said forwardly facing surface of said flange.

6. A motor vehicle headlight module as set forth in claim 2 further comprising a plurality of spaced ribs formed on the outer surface of said chamber, and wherein said flange has a pair of slots formed therein at opposite sides of said flange for accommodating a pair of said ribs extending therein, the remainder of said plurality of ribs each having a rearward facing end surface for contacting said forwardly facing surface of said flange.

7. A motor vehicle headlight module as set forth in claim 6 wherein said pair of extending ribs are fixed to said flange.

8. A motor vehicle module as set forth in claim 2 wherein said tongue as disposed on said forwardly facing surface of said flange.

9. A motor vehicle headlight module as set forth in claim 8 further comprising a plurality of spaced ribs formed on the outer surface of said chamber, and wherein said flange has a pair of slots formed therein at opposite sides of said flange for accommodating a pair of said ribs extending therein, the remainder of said plurality of ribs each having a rearward facing end surface for contacting and forwardly facing surface of said flange.

10. A motor vehicle headlight module as set forth in claim 9 wherein said pair of extending ribs are fixed to said flange.

11. A motor vehicle headlight module set forth in claim 10 wherein said neck portion chamber is substantially rectangular in cross-section.

12. A method of manufacturing a motor vehicle headlight module including the steps of:

providing a lens and reflector assembly wherein the reflector has a lens disposed a the front thereof and a rearwardly protruding elongated neck forming a chamber opening into said assembly, a capsule-connector assembly comprising a lighting capsule extending forwardly and having its leads connected to a connector member, and means for connecting the connector member and the chamber one with the other comprising a tongue disposed on one extending substantially around the periphery of the rear of the chamber and a groove on the other extending substantially around the periphery of the rear of the chamber when assembled, the groove being of greater width than the tongue;

depositing a curable adhesive material in the groove;

assembling the connector member to the chamber with the lighting capsule extending through the chamber by inserting the tongue into the chamber adhesive in the groove;

moving the connector member relative to the chamber in a direction at right angles to an imaginary line extending from said chamber toward said lens to from an optical axis of the reflector to place the lighting capsule at a desired location relative to the reflector; and curing the adhesive to fix the connector member to the chamber.

13. A method of manufacturing a motor vehicle headlight module as set forth in claim 12 which further includes the step of fixing the connector member to the chamber at two separate locations prior to the curing of the adhesive material.

14. A method of manufacturing a motor vehicle headlight module as set forth in claim 12 wherein a plurality of spaced ribs are formed on the outer surface of the chamber, each having a rearward facing surface at their ends and the connector member is fixed to the chamber at two of the rib ends.

15. A method of manufacturing a motor vehicle headlight module as set forth in claim 14 wherein the curable adhesive composition is a light curable epoxy.

* * * * *